3,766,135
REINFORCED POLYPROPYLENE COMPOSITION
AND ITS PRODUCTION
Saburo Yamanouchi, Kobe, Kiyoshi Yasuno, Ibaraki, Hiroshi Katsuki, Toyonaka, and Takayuki Terazawa, Ibaraki, Japan, assignors to Sumitomo Chemical Company, Limited, Osaka-fu, Japan
No Drawing. Filed Apr. 16, 1971, Ser. No. 134,900
Claims priority, application Japan, Apr. 16, 1970, 45/32,846; Apr. 17, 1970, 45/33,360
Int. Cl. C08f 45/10
U.S. Cl. 260—41 AG                11 Claims

ABSTRACT OF THE DISCLOSURE

A reinforced polypropylene composition which comprises polypropylene; a glass fiber material essentially consisting of glass fiber having 0.1 to 5% by weight of an adhesive layer of epoxy resin (based on the weight of the glass fiber) on its surface; and a modified polypropylene obtained by addition of 2 to 40% by weight of 3,6-endomethylene-$\Delta^4$-tetrahydrophthalic anhydride or its derivative to polypropylene (the amount of anhydride added being based on the weight of the polypropylene to be modified); the contents of the glass fiber material and the modified polypropylene being respectively 5 to 60% by weight and 0.5 to 10% by weight (based on the total weight of the composition).

---

The present invention relates to a reinforced polypropylene composition and its production. More particularly, it is concerned with a fiber-reinforced polypropylene composition comprising polypropylene, a glass fiber material and a modified polypropylene, and its production.

Hitherto, it is known that a thermoplastic resin can be improved in mechanical strength, size stability, heat resistance and the like by incorporating glass fiber therein. In the case, however, that the adhesiveness between the thermoplastic resin and glass fiber is not good, a sufficient reinforced effect is not obtained. For increasing the adhesiveness of the thermoplastic resin to glass fiber, a silane compound is usually incorporated therein as a coupling agent. However, the results of this incorporation are sometimes not satisfactory. For example, when the thermoplastic resin is a non-polar polymer such as polypropylene, its adhesiveness to glass fiber is quite inferior even if such coupling agent is incorporated.

In order to increase the adhesiveness of polypropylene to glass fiber, it has been proposed to improve the adhesiveness between polypropylene and a surface treating agent for glass fiber. For instance, Belgian Pat. No. 724,028 teaches the incorporation of an ethylene copolymer (e.g. ethylene-acrylic acid copolymer), which can form a chemical bond with a silane compound such as an aminosilane (e.g. $\gamma$-aminopropyltriethoxysilane) as a surface treating agent. The adhesiveness of polypropylene to glass fiber is thus improved by the aid of a silane compound and an ethylene copolymer. The above procedure is considerably effective in increasing the impact strength of the reinforced polypropylene, but is almost ineffective for improvement of other mechanical properties such as tensile strength and bending strength. This lack of improvement is probably due to the insufficient adhesion between polypropylene and the ethylene copolymer, although the adhesion of glass fiber with the silane compound and the ethylene copolymer may be satisfactory. Furthermore, the procedure taught by the Belgian patent is disadvantageous in requiring the use of the silane compound in a relatively large amount.

Dutch Pat. No. 6700256 discloses the incorporation of a modified polypropylene obtained by adding an $\alpha,\beta$-unsaturated acid or its anhydride to crystalline polypropylene for improvement of the adhesiveness of polypropylene to glass fiber. In this procedure, an epoxysilane or an aminosilane is also employed as a surface treating agent for glass fiber. This procedure is, however, still not satisfactory, because little or no material improvement in the adhesiveness is seen in case of using some certain kinds of glass fiber.

As the results of the extensive study, it has been found that the improvement of the adhesiveness between polypropylene and glass fiber can be more effectively attained by increasing the adhesiveness of polypropylene to a binder for glass fiber rather than by increasing the adhesiveness of polypropylene to a surface treating agent such as a silane compound.

The present invention is derived from such findings and is directed to a reinforced polypropylene composition which comprises polypropylene, a glass fiber material and a modified polypropylene in certain weight proportions.

The polypropylene in the composition of this invention may be a conventional one of stereo-regular structure. Generally, the polypropylene is highly crystalline in nature and is predominantly isotactic. It may be either homopolymer of propylene or copolymer of propylene as the main component with ethylene. The propylene may also be blended with a small amount of another polymer, which will not adversely affect the properties of propylene. The amount of polypropylene component in the composition may vary from about 30 to about 94.5% of the total weight of the composition.

The glass fiber material to be employed is made up of glass fiber (i.e. a plurality of individual fibers) having an adhesive layer or coating of epoxy resin with or without another thermosetting or thermoplastic resin on its surface. Such layer may be formed by applying an aqueous solution or emulsion of the resin with a surface treating agent such as a silane compound e.g. an aminosilane, to the surface of the glass fiber during its bundling, e.g. to a mass of individual glass fiber lengths. The amount of the adhesive layer to be applied may be from 0.1 to 5% by weight on the basis of the weight of the glass fiber. The adhesive layer is not necessarily required to be distributed over the whole surface of each glass fiber length. Usually, the fibers are relatively short in length and have small diameters; their size may vary considerably.

The amount of the glass fiber material to be incorporated into the composition of the invention may be from 5 to 60% by weight, preferably from 10 to 40% by weight, on the basis of the total weight of the composition. In case the glass fiber is less than 5% by weight, the increase of the mechanical strength and the heat resistance will not be realized. When the fiber glass is more than 60% by weight, mixing of the individual fibers with the polymers will be difficult and only an article having an uneven and inferior surface will be obtained from the composition.

The epoxy resins suitable for forming the adhesive layer on the glass fiber include those resins made from epichlorohydrin and bisphenol A (e.g. the Epon and Eponol resins); epichlorohydrin and aliphatic polyols such as glycerol; polyolefins oxidized with peracetic acid; epoxy novalacs, and the like. Generally, epoxy resins having free hydroxyl groups are preferred. Among the other useful resins which may be admixed with the epoxy resins are thermosetting resins such as phenol-formaldehyde condensates, melamine-formaldehyde condensates, urea-formaldehyde condensates, etc. and thermoplastic resins such as polyethylene, polystyrene, ABS polymers, nylon, polyvinyl acetate and others. It will be appreciated that the epoxy resin makes up not less than 15% by weight of the adhesive layer and preferably more.

The modified polypropylene is readily prepared by free radical addition of 3,6-endomethylene-$\Delta^4$-tetrahydrophthalic anhydride (also known as Nadic anhydride) or its derivative (e.g. 3,6-endomethylene-$\Delta^4$-tetrahydrophthalic acid) to polypropylene in the presence of a peroxide catalyst (e.g. t-butyl perbenzoate, dicumyl peroxide, benzoyl peroxide, t-butyl cumyl peroxide, di-t-butyl peroxide) in an inert solvent for the polypropylene (e.g. monochlorobenzene, xylene). The addition reaction is favorably effected at a temperautre around the boiling point of the reaction system; for instance at 100 to 140° C. The amount of 3,6-endomethylene-$\Delta^4$-tetrahydrophthalic anhydride or its derivative to be added may be from 2 to 40% by weight, preferably from 4 to 20% by weight, on the basis of the weight of polypropylene. When the amount added is smaller than 2% by weight, the adhesiveness of the resulting product to epoxy resin is insufficient. When the amount is higher than 40% by weight, the adhesiveness is not increased any more and the solubility with polypropylene is decreased. It will be appreciated that the polypropylene to be modified may be the same as the polypropylene used to form the reinforced composition or another similar crystalline polymer.

The amount of the modified polypropylene to be incorporated into the composition of the invention may be from 0.5 to 10% by weight, preferably from 1 to 5% by weight, on the basis of the total weight of the composition. When less than 0.5% by weight of the modified polypropylene is employed, a sufficiently improved result is not obtained. An amount of modified polypropylene of more than 10% by weight is unnecessary and uneconomical.

The mixing of the polypropylene (which may be in the form of molding powder, pellets, granules or the like), the glass fiber material and the modified polypropylene (which is usually pulverized) may be preferable accomplished in a sealed vessel by agitating mildly. Vigorous agitation is not favored, because it may result in breaking the glass fiber material. Still, the polypropylene and the modified polypropylene may be previously incorporated with an appropriate stabilizer. Still more, the composition of the invention may be admixed with a pigment, a filler or any other additive, if desired.

For production of a molded article, the composition of the invention may be molded directly by the aid of a conventional molding machine. Alternately, it may be first pelletized and then molded in a conventional manner.

Preferred embodiments of the present invention are shown in the following examples wherein the parts given are by weight. It will be understood, however, that these examples are merely illustrative and not intended to be limitative of the scope of the invention.

EXAMPLES 1–3

Stereo-regular polypropylene (the intrinsic viscosity determined in tetralin at 135° C. being $[\eta]=2.4$) (100 parts), 3,6-endomethylene-$\Delta^4$-tetrahydrophthalic anhydride (50 parts) and t-butyl perbenzoate (30 parts) are dissolved in monochlorobenzene (1000 parts). The resultant solution is heated at 120° C. for 4 hours in nitrogen stream while stirring. After cooling to about 70° C., the reaction mixture is dropwise added to acetone. The precipitated polymer is collected by filtration with suction, dried and pulverized to give modified polypropylene containing about 4.4% by weight of 3,6-endomethylene-$\Delta^4$-tetrahydrophthalic anhydride on the basis of the weight of the starting polypropylene.

The above obtained modified polypropylene (3% by weight) and glass fiber (diameter, 10$\mu$; length, 6 mm.; E glass) having an adhesive layer either of about 0.3 or about 0.6% by weight of epoxy resin or of about 1.3% by weight of epoxy resin and vinyl acetate resin (1:1 by weight) on the basis of the weight of the glass fiber (30% by weight) are admixed with stereo-regular polypropylene in particular form (the intrinsic viscosity determined in tetralin at 135° C. being $[\eta]=1.8$) (trade name "Sumitomo Noblen W501"). The resultant mixture is extruded at 240° C. by the aid of a 30 mm. extruder and pelletized. The thus obtained pellets are shaped at 270° C. by the aid of a 5 oz. screw-type injection moulding machine of which the mould temperature is 50° C. and the back pressure of the screw is 10 kg./cm.$^2$ to make test pieces. The test pieces are subjected to measurement of various physical or mechanical properties.

For control, test pieces are prepared in the same manner as above but without incorporation of the modified polypropylene or with incorporation of the modified polypropylene and the use of glass fiber having an adhesive layer of vinyl acetate resin or ethylene-methyl acrylate copolymer. These test pieces are also subjected to measurement of various physical or mechanical properties.

The results are shown in Table I wherein the measurements are made according to the following standard methods: tensile strength, ASTM D638–64T; bending strength, ASTM D790–63; Charpy impact strength, ASTM D256–56T; heat distortion temperature, ASTM D648–56.

From the results as shown in Table 1, it will be understood that the properties of the reinforced polypropylene composition of the invention are excellent and much better than the control compositions, particularly with respect to heat resistance and mechanical properties.

TABLE 1

| Example No. | Glass fiber binder Kind | Amount adhered (percent by weight) | Amount of modified polypropylene (percent by weight) | Tensile strength (kg./cm.$^2$) | Bending strength (kg./cm.$^2$) | Charpy impact strength (kg.-cm./cm.$^2$) | Heat distortion temperature (° C.) |
|---|---|---|---|---|---|---|---|
| 1 | Epoxy resin | 0.3 | 3 | 880 | 1,200 | 8.6 | 148 |
| 2 | do | 0.6 | 3 | 910 | 1,280 | 9.1 | 150 |
| 3 | Epoxy resin plus vinyl acetate (1:1) | 1.3 | 3 | 929 | 1,134 | 8.8 | 149 |
| Control | Epoxy resin | 0.6 | 0 | 480 | 560 | 5.1 | 105 |
| Do | Vinyl acetate resin | 1.6 | 3 | 600 | 740 | 5.6 | 136 |
| Do | Ethylene-methyl acrylate copolymer | 0.6 | 3 | 593 | 785 | 5.0 | 138 |

EXAMPLES 4–8

Test pieces are prepared in the same manner as in Example 2, but varying the amount of modified polypropylene incorporated. The test pieces obtained were subjected to measurement of various physical or mechanical properties.

The results are shown in Table 2.

TABLE 2

| Example No. | Amount of modified polypropylene (percent by weight) | Tensile strength (kg./cm.$^2$) | Bending strength (kg./cm.$^2$) | Charpy impact strength (kg.-cm./cm.$^2$) | Heat distortion temperature (° C.) |
|---|---|---|---|---|---|
| 4 | 0.2 | 685 | 773 | 5.8 | 123 |
| 5 | 1.0 | 835 | 1,042 | 7.4 | 142 |
| 6 | 2.0 | 910 | 1,230 | 9.0 | 150 |
| 7 | 5.0 | 912 | 1,214 | 9.2 | 151 |
| 8 | 10.0 | 890 | 1,205 | 9.0 | 150 |

It will be observed that when 0.2% by weight of the modified polypropylene is added, the properties of the resulting test pieces are considerably poorer than those obtained in accordance with the invention.

What is claimed is:

1. A reinforced polypropylene composition which comprises polypropylene, a glass fiber material comprising glass fiber having 0.1 to 5% by weight of an epoxy resin-containing adhesive layer thereon, said weight percentages being based on the glass fibers and a modified polypropylene obtained by the free radical addition of 2 to 40% by weight of 3,6-endomethylene-$\Delta^4$-tetrahydrophthalic anhydride or 3,6-endomethylene-$\Delta^4$-tetrahydrophthalic acid to polypropylene, said weight percentages being based on the weight of the polypropylene to be modified; the contents of the glass fiber material and the modified polypropylene being, respectively, 5 to 60% by weight and 0.5 to 10% by weight based on the weight 2. The reinforced polypropylene composition according to claim 1 wherein the content of glass fiber material is from 10 to 40% by weight of the total weight of the composition.

3. The reinforced polypropylene composition according to claim 1 wherein the content of the modified polypropylene is from 1 to 5% by weight of the total weight of the composition.

4. The reinforced polypropylene composition according to claim 1 wherein the adhesive layer of glass fiber contains epoxy resin and at least one thermosetting or thermoplastic resin.

5. The polypropylene composition of claim 4 in which the adhesive layer on the glass fiber contains epoxy resin and vinyl acetate resin in a 1:1 weight ratio.

6. The reinforced polypropylene composition according to claim 1 wherein the modified polypropylene is prepared by the free radical addition of 3,6-endomethylene-$\Delta^4$-tetrahydrophthalic anhydride or 3,6-endomethylene-$\Delta^4$-tetrahydrophthalic acid to polypropylene in the presence of a peroxide catalyst in an inert solvent.

7. The reinforced polypropylene composition according to claim 6 in which the addition reaction is conducted at a temperature of from 100 to 140° C.

8. The reinforced polypropylene composition according to claim 6 in which said derivative is 3,6-endomethylene-$\Delta^4$-tetrahydrophthalic acid.

9. A process for producing glass fiber reinforced polypropylene structures which comprises forming a reinforced polypropylene composition by admixing polypropylene with from about 5 to 60% by weight of glass fiber material and from about 0.5 to 10% by weight of a modified polypropylene, said weight percentages being based on the total weight of the composition, said fiber glass material having an adhesive epoxy resin-containing coating and said modified polypropylene obtained by the free radical addition of 2 to 40% by weight of 3,6-endomethylene-$\Delta^4$-tetrahydrophthalic anhydride or 3,6-endomethylene-$\Delta^4$-tetrahydrophthalic acid, and then molding the composition at elevated molding temperatures to form a reinforced polypropylene structure of the desired shape.

10. The process of claim 9 in which the reinforced polypropylene composition is first extruded and pelletized, and the pellets obtained are shaped in a mold at temperature above the softening point of the composition to form said structure.

11. The reinforced polypropylene composition according to claim 6, wherein the amount of the 3,6-endomethylene-$\Delta^4$-tetrahydrophthalic anhydride or 3,6-endomethylene-$\Delta^4$-tetrahydrophthalic acid is from 4 to 20% by weight, on the basis of the weight of the polypropylene.

References Cited
UNITED STATES PATENTS 3,416,990　12/1968　Robinson _____ 260—41 AG
3,277,036　10/1966　Whitworth et al. __ 260—88.1 R

FOREIGN PATENTS 1,964,538　6/1970　Germany.

OTHER REFERENCES

Chemical Abstracts, vol. 72, 1970, 101 331e.

MORRIS LIEBMAN, Primary Examiner

J. H. DERRINGTON, Assistant Examiner

U.S. Cl. X.R.

117—126 GE, 26 GR; 260—878 R